US012592778B2

(12) United States Patent
Rathinasamy et al.

(10) Patent No.: US 12,592,778 B2
(45) Date of Patent: Mar. 31, 2026

(54) SIDEBAND MANAGEMENT OF INFORMATION TECHNOLOGY ASSETS UTILIZING VISIBLE LIGHT COMMUNICATIONS

(71) Applicant: Dell Products L.P., Round Rock, TX (US)

(72) Inventors: Shree Rathinasamy, Round Rock, TX (US); Yayun Liu, Austin, TX (US); Jun Gu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 355 days.

(21) Appl. No.: 18/477,703

(22) Filed: Sep. 29, 2023

(65) Prior Publication Data

US 2025/0112704 A1 Apr. 3, 2025

(51) Int. Cl.
*H04B 10/114* (2013.01)
*H04B 10/116* (2013.01)
*H04B 10/29* (2013.01)
*H04B 10/516* (2013.01)
*H04B 10/572* (2013.01)

(52) U.S. Cl.
CPC ....... *H04B 10/5165* (2013.01); *H04B 10/114* (2013.01); *H04B 10/1143* (2013.01); *H04B 10/116* (2013.01); *H04B 10/29* (2013.01); *H04B 10/572* (2013.01)

(58) Field of Classification Search
CPC .......... H04B 10/11–118; H04B 10/114; H04B 10/116; H04B 10/1143; H04B 10/572

USPC .......................................... 398/118–131, 172
See application file for complete search history.

(56) References Cited

U.S. PATENT DOCUMENTS

| | | | | | |
|---|---|---|---|---|---|
| 4,850,044 A | * | 7/1989 | Block | .................. | H04B 10/803 398/118 |
| 6,483,621 B1 | * | 11/2002 | Adams | ............... | H04B 10/1121 398/131 |
| 8,200,094 B1 | * | 6/2012 | Zhovnirovsky | ...... | H04B 10/803 398/118 |

(Continued)

OTHER PUBLICATIONS

Dell Technologies, "Dell EMC PowerEdge R750," Installation and Service Manual, Regulatory Model: E70S, Aug. 2023, 254 pages.

(Continued)

*Primary Examiner* — Li Liu
(74) *Attorney, Agent, or Firm* — Ryan, Mason & Lewis, LLP

(57) ABSTRACT

An apparatus comprises at least one processing device configured to receive, at a first hardware component of an information technology asset, sideband management data for the information technology asset. The at least one processing device is also configured to utilize a first light-based communication module of the first hardware component to convert the received sideband management data into one or more visible light communication signals. The at least one processing device is further configured to transmit the received sideband management data by providing the one or more visible light communication signals from the first light-based communication module of the first hardware component of the information technology asset to a second light-based communication module of a second hardware component of the information technology asset.

20 Claims, 7 Drawing Sheets

(56) References Cited

U.S. PATENT DOCUMENTS

| | | | |
|---|---|---|---|
| 2004/0234232 A1* | 11/2004 | Levy | H04B 10/801 |
| | | | 385/147 |
| 2016/0226593 A1* | 8/2016 | Ganick | H04B 10/502 |
| 2018/0316425 A1* | 11/2018 | Katiyar | H04B 10/116 |
| 2021/0351948 A1* | 11/2021 | Lewis | H04L 63/0876 |
| 2022/0100524 A1* | 3/2022 | Gupta | H04L 41/0853 |
| 2022/0123920 A1* | 4/2022 | Pike | H04L 9/0891 |
| 2022/0210229 A1* | 6/2022 | Maddukuri | G06F 9/3877 |
| 2023/0128409 A1* | 4/2023 | Hughes | H04W 56/002 |
| | | | 398/118 |
| 2023/0412281 A1* | 12/2023 | Das Sharma | H04B 10/516 |

OTHER PUBLICATIONS

K. D. Salman et al., "Visible Light Fidelity Technology: Survey," Iraqi Journal of Computers, Communications, Control & Systems Engineering, vol. 21, No. 2, Jun. 2021, 15 pages.

Mellanox Technologies, "Enhancing Networks with SmartNICs," Solution Brief, Dec. 2018, 3 pages.

D. V. Nivrutti et al., "Light-Fidelity: A Reconnaissance of Future Technology," International Journal of Advanced Research in Computer Science and Software Engineering, vol. 3, No. 11, Nov. 2013, 4 pages.

Intel, "SmartNICs with Intel FPGAs Boost Performance for Converged Broadband Networks," Solution Brief, Oct. 2020, 3 pages.

* cited by examiner

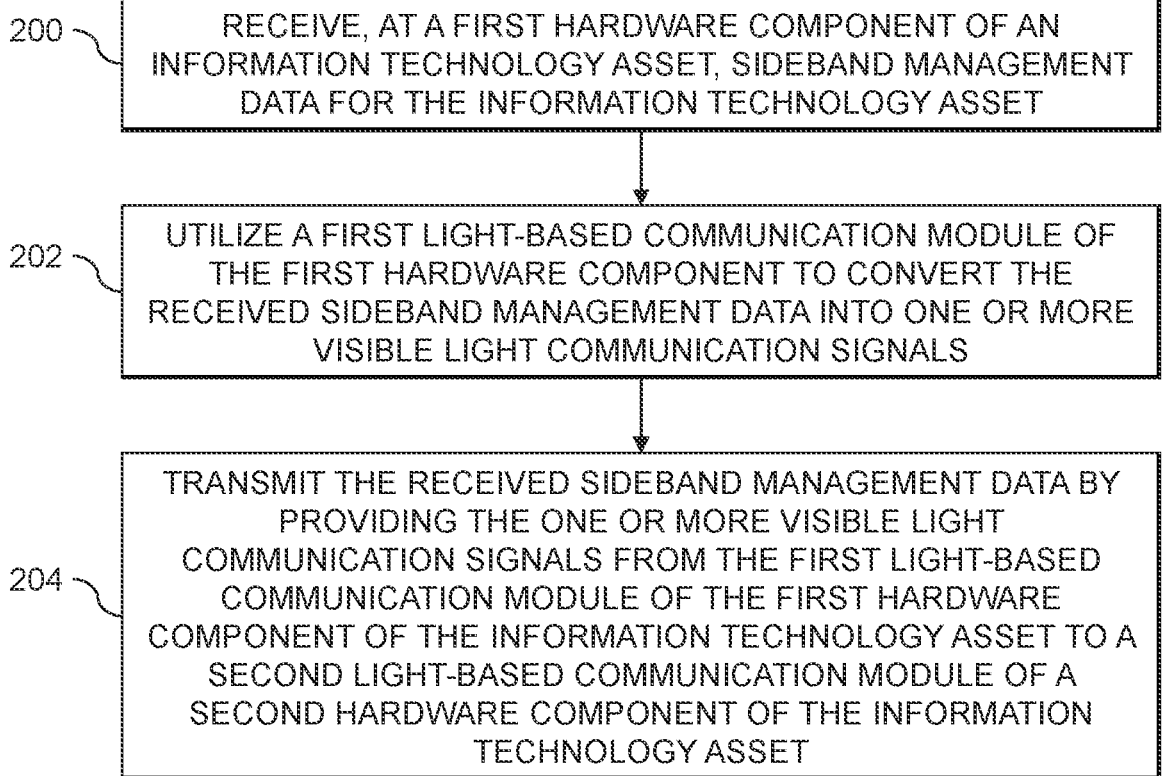

200 — RECEIVE, AT A FIRST HARDWARE COMPONENT OF AN INFORMATION TECHNOLOGY ASSET, SIDEBAND MANAGEMENT DATA FOR THE INFORMATION TECHNOLOGY ASSET

202 — UTILIZE A FIRST LIGHT-BASED COMMUNICATION MODULE OF THE FIRST HARDWARE COMPONENT TO CONVERT THE RECEIVED SIDEBAND MANAGEMENT DATA INTO ONE OR MORE VISIBLE LIGHT COMMUNICATION SIGNALS

204 — TRANSMIT THE RECEIVED SIDEBAND MANAGEMENT DATA BY PROVIDING THE ONE OR MORE VISIBLE LIGHT COMMUNICATION SIGNALS FROM THE FIRST LIGHT-BASED COMMUNICATION MODULE OF THE FIRST HARDWARE COMPONENT OF THE INFORMATION TECHNOLOGY ASSET TO A SECOND LIGHT-BASED COMMUNICATION MODULE OF A SECOND HARDWARE COMPONENT OF THE INFORMATION TECHNOLOGY ASSET

SIDEBAND MANAGEMENT OF INFORMATION TECHNOLOGY ASSETS UTILIZING VISIBLE LIGHT COMMUNICATIONS

BACKGROUND

Support platforms may be utilized to provide various services for sets of managed computing devices. Such services may include, for example, troubleshooting and remediation of issues encountered on computing devices managed by a support platform. This may include periodically collecting information on the state of the managed computing devices, and using such information for troubleshooting and remediation of the issues. Such troubleshooting and remediation may include receiving requests to provide servicing of hardware and software components of computing devices. For example, users of computing devices may submit service requests to a support platform to troubleshoot and remediate issues with hardware and software components of computing devices. Such requests may be for servicing under a warranty or other type of service contract offered by the support platform to users of the computing devices. Support platforms may also provide functionality for testing managed computing devices.

SUMMARY

Illustrative embodiments of the present disclosure provide techniques for sideband management of information technology assets utilizing visible light communications.

In one embodiment, an apparatus comprises at least one processing device comprising a processor coupled to a memory. The at least one processing device is configured to receive, at a first hardware component of an information technology asset, sideband management data for the information technology asset. The at least one processing device is also configured to utilize a first light-based communication module of the first hardware component to convert the received sideband management data into one or more visible light communication signals. The at least one processing device is further configured to transmit the received sideband management data by providing the one or more visible light communication signals from the first light-based communication module of the first hardware component of the information technology asset to a second light-based communication module of a second hardware component of the information technology asset.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for sideband management of information technology assets utilizing visible light communications in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
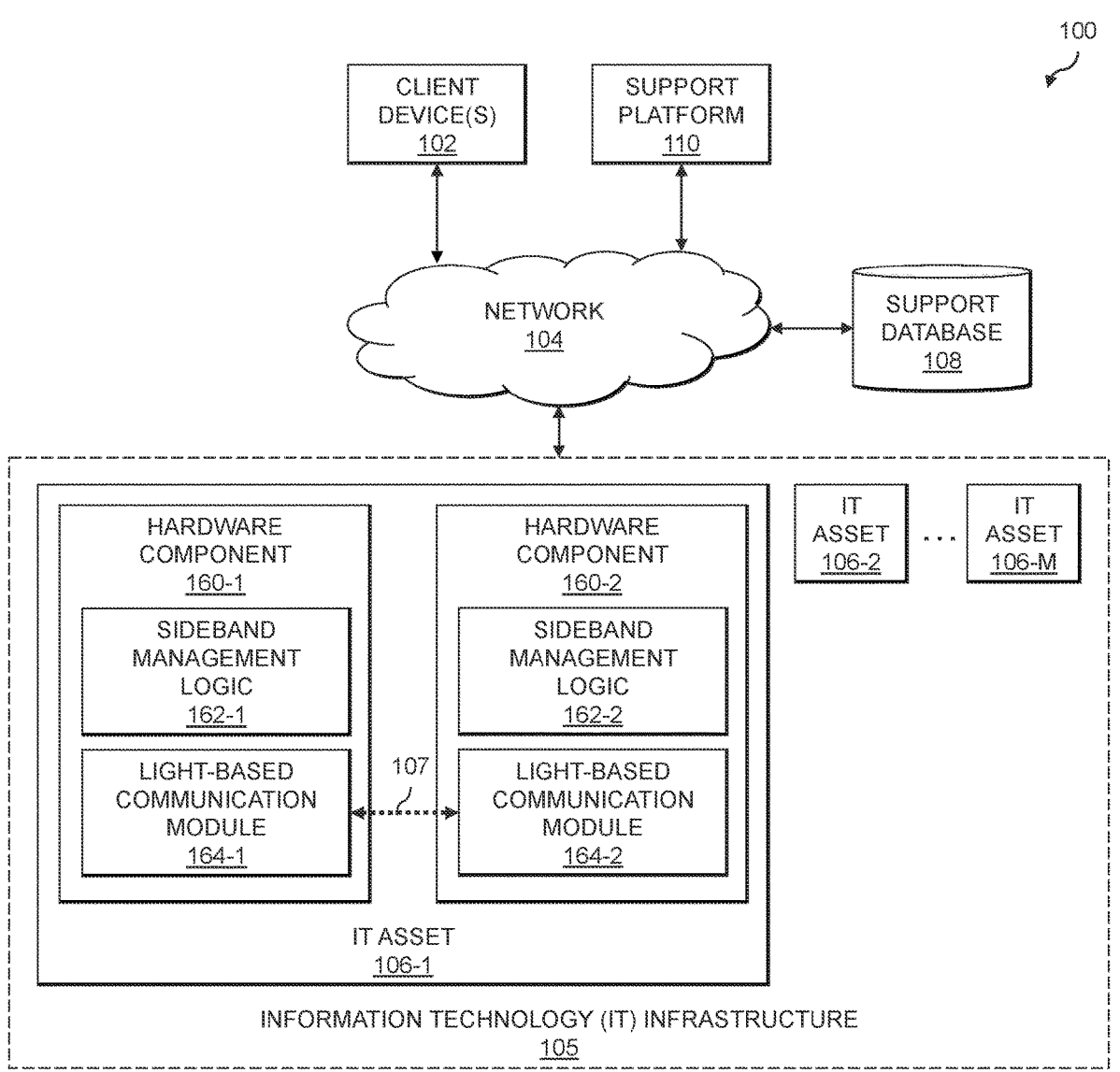
FIG. 1 is a block diagram of an information processing system configured for sideband management of information technology assets utilizing visible light communications in an illustrative embodiment.

FIG. 1 shows an information processing system 100 configured in accordance with an illustrative embodiment. The information processing system 100 is assumed to be built on at least one processing platform and provides functionality for management of information technology (IT) assets in an IT infrastructure environment using transmission of sideband management data utilizing visible light communications (VLC). The system 100 includes one or more client devices 102 which are coupled via network 104 to an IT infrastructure 105 comprising a plurality of IT assets 106-1, 106-2 . . . 106-M (collectively, IT assets 106). A support database 108 and support platform 110 are also coupled to the network 104, and may be used to perform various management actions for the IT assets 106. In some cases, such management actions are performed using "sideband" management facilitated by communication among different hardware components of the IT assets 106 as will be described in further detail below. The IT assets 106 may include one or more physical and/or virtual computing resources. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

The support platform 110 may comprise an IT support system operated by an enterprise or other entity that provides support services for the IT infrastructure 105. The enterprise or other entity that provides support services for the IT infrastructure 105 may be the same as or different than the enterprise or other entity that operates the IT infrastructure 105. For example, an enterprise or other entity operating the IT infrastructure 105 may subscribe to or otherwise utilize the support platform 110 for providing support or management services for the IT assets 106. In some cases, the support platform 110 is operated by a vendor of the IT assets 106. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include the client devices 102 and/or the support platform 110. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise a computer associated with a particular company, organization or other enterprise. Thus, the client devices 102 may be considered examples of assets of an enterprise system. In addition, at least portions of the system 100 may also be referred to herein as collectively comprising one or more "enterprises." Numerous other operating scenarios involving a wide variety of different types and arrangements of processing nodes are possible, as will be appreciated by those skilled in the art.

Although not explicitly shown in FIG. 1, one or more input-output devices such as keyboards, displays or other types of input-output devices may be used to support one or more user interfaces to the client devices 102, the IT assets 106, the support database 108, and the support platform 110, as well as to support communication between these elements and other related systems and devices not explicitly shown.

The client devices 102 are configured to access or otherwise utilize the IT infrastructure 105. In some embodiments, the client devices 102 are assumed to be associated with system administrators, IT managers or other authorized personnel responsible for managing the IT assets 106 of the IT infrastructure 105 (e.g., where such management includes performing servicing of the IT assets 106, or of applications or other software that runs on the IT assets 106). The support platform 110 may also be used to provide management or other support for the IT assets 106 of the IT infrastructure. Such management may involve use of the sideband communications, where management commands may be relayed among hardware components of the IT assets 106. In some embodiments, the IT assets 106 of the IT infrastructure 105 are owned or operated by the same enterprise that operates the client devices 102 and/or the support platform 110 (e.g., where an enterprise such as a business provides support for the assets it operates). In other embodiments, the IT assets 106 of the IT infrastructure 105 may be owned or operated by one or more enterprises different than the enterprise which operates the client devices 102 and/or the support platform 110 (e.g., a first enterprise provides support for assets that are owned by multiple different customers, business, etc.). Various other examples are possible.

In some embodiments, the client devices 102 and/or the IT assets 106 may implement host agents that are configured for automated transmission of information that is to be provided to the support platform 110. Such host agents may also or alternatively be configured to automatically receive from the support platform 110 management commands, configuration commands or other information (e.g., via the network 104 and possibly sideband communications among hardware components of the IT assets 106). It should be noted that a "host agent" as this term is generally used herein may comprise an automated entity, such as a software entity running on a processing device. Accordingly, a host agent need not be a human entity.

The support database 108 is configured to store and record various information that is utilized by the support platform 110. Such information may include, for example, management commands which have been or are to be provided to the IT assets 106, information related to the hardware components of the IT assets 106, including which of the hardware components of the IT assets 106 are configured for sideband communications facilitating the relay of management commands among the hardware components of the IT assets, etc. In some embodiments, one or more storage systems utilized to implement the support database 108 comprise a scale-out all-flash content addressable storage array or other type of storage array. Various other types of storage systems may be used, and the term "storage system" as used herein is intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

The client devices 102, the IT assets 106, the support platform 110 and other elements of the information processing system 100 in the FIG. 1 embodiment are assumed to be implemented using at least one processing device. Each such processing device generally comprises at least one processor and an associated memory, and implements one or more functional modules or logic for controlling certain features of the information processing system 100. In the FIG. 1 embodiment, for example, the IT asset 106-1 comprises multiple hardware components, including a first hardware component 160-1 and at least a second hardware component 160-2, which are collectively referred to herein as hardware components 160. The hardware components 160 may include various different types of hardware. For example, in some embodiments the hardware component 160-1 comprises a baseboard management controller (BMC) while the hardware component 160-2 comprises a smart network interface card (SmartNIC), a data processing unit (DPU), etc. The support platform 110 may be configured to provide, via network 104, management commands to one of the hardware components 160 (e.g., the hardware component 160-2 comprising a SmartNIC) which are then relayed to another one of the hardware components 160 (e.g., the hardware component 160-1 comprising a BMC). The hardware components 160-1 and 160-2 implement respective instance of sideband management logic 162-1 and 162-2 (collectively, sideband management logic 162), as well as respective instance of light-based communication modules 164-1 and 164-2 (collectively, light-based communication modules 164). The light-based communication modules 164 may comprise, for example Light Fidelity (LiFi) communication modules. The sideband management logic 162 is configured to identify sideband management data (e.g., one or more management commands, configuration commands or other types of commands) to be relayed or otherwise communicated between the hardware components 160, and to utilize the light-based communication modules 164 for transmitting the identified sideband management data between the hardware components using VLC 107. For example, the light-based communication modules 164 may include respective light sources (e.g., light-emitting diodes (LEDs)) and light detectors (e.g., photodiodes) which are able to transmit and receive VLC-based signals for transmitting the identified sideband management data.

At least portions of the sideband management logic 162 may be implemented at least in part in the form of software that is stored in memory and executed by a processor.

It is to be appreciated that the particular arrangement of the client devices 102, the IT infrastructure 105, the IT assets 106, the support database 108 and the support platform 110 illustrated in the FIG. 1 embodiment is presented by way of example only, and alternative arrangements can be used in other embodiments.

The support platform 110 and other portions of the system 100, as will be described in further detail below, may be part of cloud infrastructure.

The client devices 102, the IT infrastructure 105, the IT assets, the support database 108, the support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, the IT infrastructure 105, the IT assets 106, the support database 108, the support platform 110, or components thereof or other components of the information processing system 100 in the FIG. 1 embodiment, may be implemented on respective distinct processing platforms, although numerous other arrangements are possible. For example, in some embodiments at least portions of the client devices 102 and the support platform 110 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, the IT assets 106, the support database 108 and the support platform 110, or portions or components thereof, to reside in different data centers. Numerous other distributed implementations are possible.

Additional examples of processing platforms utilized to implement the information processing system 100 in illustrative embodiments will be described in more detail below in conjunction with FIGS. 6 and 7.

It is to be appreciated that these and other features of illustrative embodiments are presented by way of example only, and should not be construed as limiting in any way.

It is to be understood that the particular set of elements shown in FIG. 1 for sideband management of IT assets utilizing VLC is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for sideband management of IT assets utilizing VLC will now be described in more detail with reference to the flow diagram of FIG. 2. It is to be understood that this particular process is only an example, and that additional or alternative processes for sideband management of IT assets utilizing VLC may be used in other embodiments.

In this embodiment, the process includes steps 200 through 204. These steps are assumed to be performed by one or more of the hardware components 160 utilizing the sideband management logic 162 and the light-based communication modules 164. The process begins with step 200, receiving, at a first hardware component (e.g., 160-1) of an IT asset (e.g., 106-1), sideband management data for the IT asset. In step 202, a first light-based communication module (e.g., 164-1) of the first hardware component is used to convert the received sideband management data into one or more VLC signals. The received sideband management data is transmitted in step 204 by providing the one or more VLC signals from the first light-based communication module of the first hardware component of the IT asset to a second light-based communication module (e.g., 164-2) of a second hardware component (e.g., hardware component 160-2) of the IT asset. The first hardware component may comprise a network interface card (NIC) and the second hardware component may comprise a baseboard management controller (BMC). The NIC may comprise a smart NIC, a data processing unit (DPU), etc. The NIC may comprise a sideband management network port configured for receiving the sideband management data from a support platform (e.g., 110) external to the IT asset. The first and second light-based communication modules may comprise LiFi communication modules.

In some embodiments, at least one of the first hardware component and the second hardware component is associated with a reconfigurable intelligent surface (RIS) configured to control a wavelength of the one or more VLC signals provided from the first light-based communication module of the first hardware component to the second light-based communication module of the second hardware component. The first hardware component may be installed in a slot of a motherboard of the IT asset, the RIS may be associated with the slot of the motherboard of the IT asset in which the first hardware component is installed, and the RIS associated with the slot of the motherboard of the IT asset in which the first hardware component is installed may provide a virtual mapping of the first hardware component to a given wavelength of visible light.

The first hardware component may be installed in a first slot of a motherboard of the IT asset and a third hardware component may be installed in a second slot of the motherboard of the IT asset, wherein the first slot of the motherboard of the IT asset is associated with a first RIS and the second slot of the motherboard of the IT asset is associated with a second RIS. The first RIS may provide a first virtual mapping of the first hardware component to a first wavelength of visible light and the second RIS may provide a second virtual mapping of the third hardware component to a second wavelength of visible light, the second wavelength of visible light being different than the first wavelength of visible light. The first hardware component and the third hardware component may comprise respective SmartNICs.

In some embodiments, the first light-based communication module comprises a transmit (TX) unit comprising a digital-to-analog converter (DAC) configured to convert the sideband management data into one or more analog signals, an amplifier configured to amplify the one or more analog signals, and a light emitting diode (LED) driver configured to drive one or more LEDs of the first light-based communication module to communicate the amplified one or more analog signals as the one or more VLC signals. The second light-based communication module may comprise a receive (RX) unit comprising one or more photodiodes configured to capture the one or more VLC signals communicated from the one or more LEDs of the first light-based communication module, an amplifier configured to amplify the one or more VLC signals captured by the one or more photodiodes, a low pass filter configured to filter the amplified one or more VLC signals captured by the one or more photodiodes, and an analog-to-digital converter (ADC) configured to convert a filtered output of the low pass filter into one or more digital signals comprising the sideband management data.

In some embodiments, the IT asset comprises one or more reflectors. Providing the one or more VLC signals from the first light-based communication module of the first hardware component of the IT asset to the second light-based communication module of the second hardware component of the IT asset may comprise reflecting the one or more VLC signals using the one or more reflectors.

The FIG. 2 process may further include receiving, at the first light-based communication module of the first hardware component, additional sideband management data communicated as one or more additional VLC signals provided from the second light-based communication module of the second hardware component. The one or more additional VLC signals provided from the second light-based communication module of the second hardware component may utilize a given wavelength of visible light mapped to a slot of a motherboard of the IT asset in which the first hardware component is installed, and a RIS associated with at least one of the first hardware component and the slot of the motherboard of the IT asset in which the first hardware component is installed is configured to provide a virtual mapping of the first hardware component to the given wavelength of visible light.

IT assets, also referred to herein as IT equipment, may include various compute, network and storage hardware or other electronic equipment, and are typically installed in an electronic equipment chassis. The electronic equipment chassis may form part of an equipment cabinet (e.g., a computer cabinet) or equipment rack (e.g., a computer or server rack, also referred to herein simply as a "rack") that is installed in a data center, computer room or other facility. Equipment cabinets or racks provide or have physical electronic equipment chassis that can house multiple pieces of equipment, such as multiple computing devices (e.g., blade or compute servers, storage arrays or other types of storage servers, storage systems, network devices, etc.). As noted above, an electronic equipment chassis typically complies with established standards of height, width and depth to facilitate mounting of electronic equipment in an equipment cabinet or other type of equipment rack. For example, standard chassis heights such as 1 U, 2 U, 3 U, 4 U and so on are commonly used, where U denotes a unit height of 1.75 inches (1.75") in accordance with the well-known EIA-310-D industry standard.

Edge computing devices may be more compact than their data center counterparts, and continue to get denser (e.g., using smaller electronic equipment chassis). With the increased use of components such as smart network interface cards (SmartNICs), data processing units (DPUs), etc., there are additional cards and cables needed for sideband management (e.g., management interface card (MICs) and associated management cables). This leads to a plethora of problems and complexity, as discussed below. Compounding such issues is the lack of IT skills for a majority of the personnel working on IT assets deployed in edge environments who might need to perform some installations. There is therefore a need for robust technical solutions that aid in management communications between components (e.g., SmartNICs, DPUs, etc. and BMCs) of IT assets. The technical solutions should be secure, since security is an important facet of edge and other computing solutions. The technical solutions described herein meet these and other needs.

Edge and telecommunications service provider (Telco) environments are examples of IT infrastructure environments where IT assets may be deployed. Edge and Telco environments include, for example, hospitals, retail stores, backroom closets, etc. Telco devices may be deployed in remote locations, making such devices susceptible to hackers and damage due to vandalism. This has led to the design of edge and Telco systems with a focus on security to provide a good level of confidence in maintaining data integrity and acting upon the collected data at the edge and Telco systems.

For edge computing devices, network connectivity is typically provided using network interface cards (NICs). With the advent of more capabilities, components such as SmartNICs, DPUs, etc. are gaining popularity. SmartNICs, DPUs, etc. may be a great fit for edge computing environments, as such components aid in offloading central processing unit (CPU) cycles for certain processes and applications (e.g., offloading network processing such as a Transport Control Protocol/Internet Protocol (TCP/IP) stack, compression/decompression, encryption/decryption, security functionality, etc.). In some cases, components such as SmartNICs and DPUs are configured to provide sideband system management functionality. This includes replacing a Lights Out Management (LOM) board on the motherboard of an IT asset with a MIC, which connects the BMC and SmartNIC/DPU cards to enable hardware arbitration and communication with the management controller/BMC. The MIC is designed to enable Network Controller Sideband Interface (NC-SI) communication with a BMC, and is plugged into a LOM slot of the motherboard and connects to the BMC using NC-SI rather than the LOM. The MIC may have three connectors-a first connector for a universal asynchronous receiver/transmitter (UART) cable connecting the MIC card and a rear input output (RIO) card, and two connectors for NC-SI MIC cables connecting the MIC card to other components (e.g., SmartNICs, DPUs, etc.).

Some Telco adapters offer NC-SI over Reduced Media Independent Interface (RMII) Based Transport (RBT) features, which requires designing new management cables to accommodate different platforms. This approach presents various technical challenges, including increased complexity as different cables and MICs need to be used for different platforms, and an increase in the number of Stock Keeping Units (SKUs). Further, servers and other IT assets are getting increasingly dense, which is compounded in edge compute devices which may require a smaller footprint than data center servers. This leads to space constraints inside the servers or other IT assets that limit the number of cables that can be used. It is also very difficult to maneuver and install cables in dense server configurations. Further, longer cables give rise to signal integrity issues. In some cases, the shortest path for the cables may be blocked by other hardware components, such as power supply units (PSUs), peripheral component interconnect express (PCIe) adapters, risers, etc. As a result, longer cables may be necessary to establish the required connections. However, using longer cables can increase the risk of signal degradation and impact performance of the system.

Further technical challenges are associated with the lack of flexibility for accommodating new requirements in fast-moving markets. Sideband system management, for example, may require replacement of the LOM board on the motherboard with a MIC. In addition, appropriate cables need to be routed between the NIC and the MIC, and in between the MIC and the RIO card. This can lead to possible damage to connector pins and cables if the installation is not done properly. As personnel in edge environments may have little or no IT skills, intricate activities such as replacing the LOM board with the MIC can be overwhelming.

In the case of field serviceability, to install the sideband management for the NIC, multiple steps are needed which are tedious and time-consuming. For example, the following steps may be needed:

1. Remove PSUs;
2. Remove server cover;
3. Remove expansion card risers;
4. Remove air shrouds;
5. Remove cooling fan assembly cage;
6. Remove side wall brackets;
7. Remove the planar from the system;
8. Remove the LOM card;
9. Install the MIC;
10. Re-assemble the system back by performing the steps again in a reverse order from 7-4;
11. Connect a UART cable from the MIC to the RIO card;
12. Connect a management cable from a SmartNIC to the MIC;
13. Put the server cover back on;
14. Install the PSUs; and
15. Bring the device back to operation.

A longer serviceability window leads to longer down time, unavailability of critical servers, and lower customer satisfaction. The longer serviceability window can also lead to an increase in calls to support.

In some cases, a controller (e.g., an Integrated Dell Remote Access Controller (iDRAC)) relies on a SmartNIC PCIe slot and an NC-SI Package identifier (ID) to enable the sideband management of the SmartNIC. The lack of the restriction for SmartNIC location (e.g., the SmartNIC can be in any PCIe slot), and the limitation of the NC-SI Package ID determination from the MIC, results in the PCIe slot and NC-SI Package ID assignment being a random process based on the connections. In turn, this complicates the factory process to enforce a valid configuration, and can easily result in misconfiguration. Further, in the field, a customer or end-user may see incorrect details of a specific SmartNIC in an edge compute device.

The technical solutions described herein provide an approach which eliminates the use of cables to provide sideband management connectivity between components of an IT asset, such as between a BMC and a SmartNIC or DPU, through the use of wireless transmission of sideband management data using visible light communication (VLC). The technical solutions further provide functionality for mapping of PCIe slots to components installed therein (e.g., SmartNICs, DPUs, etc.) to facilitate sideband management. Such mappings may be enforced using wavelength filters in the PCIe slots.

Figure 3:
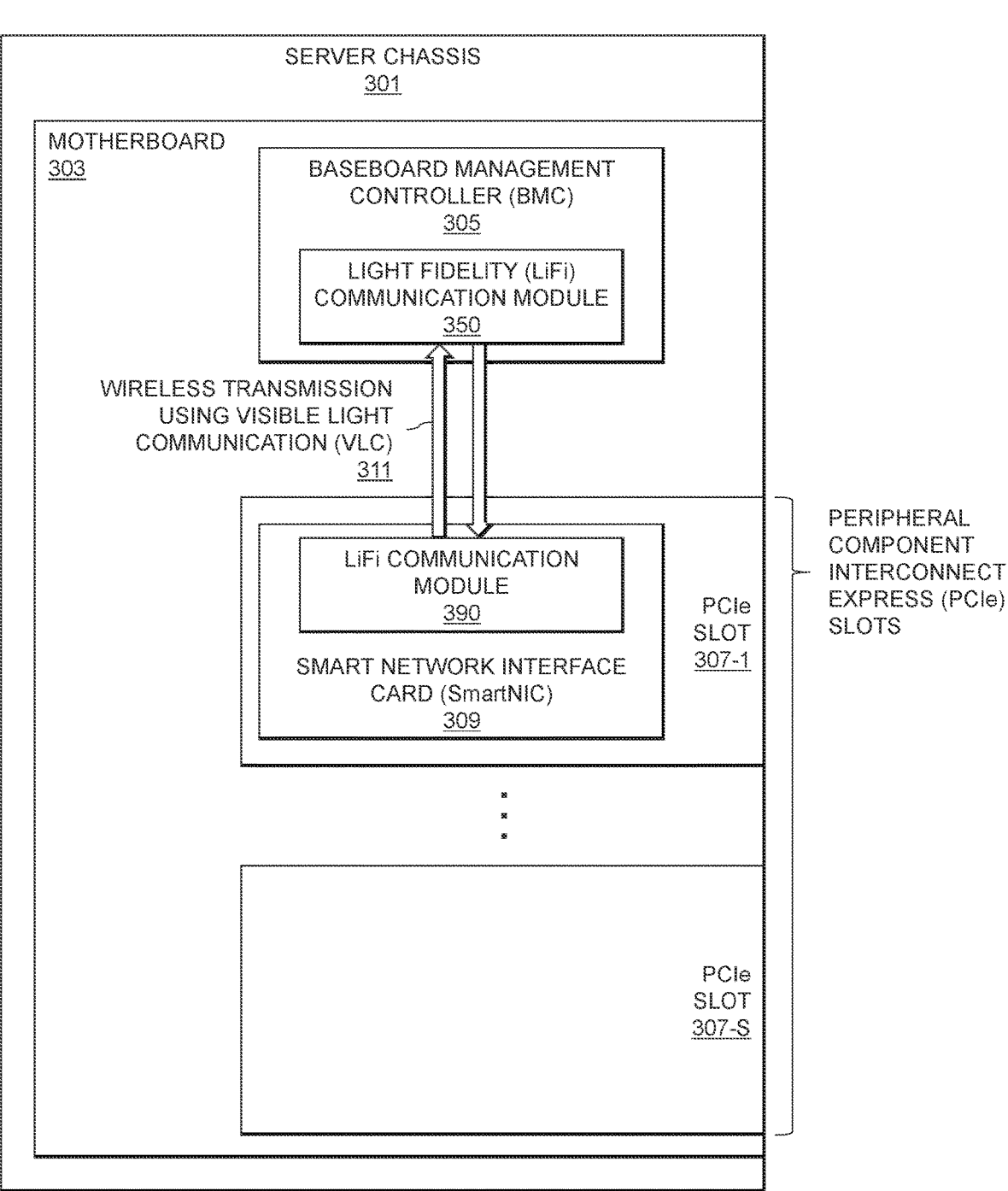
FIG. 3 shows a server chassis with a baseboard management controller and a smart network interface card configured for wireless transmission of sideband management data utilizing visible light communication in an illustrative embodiment.
Figure 4:
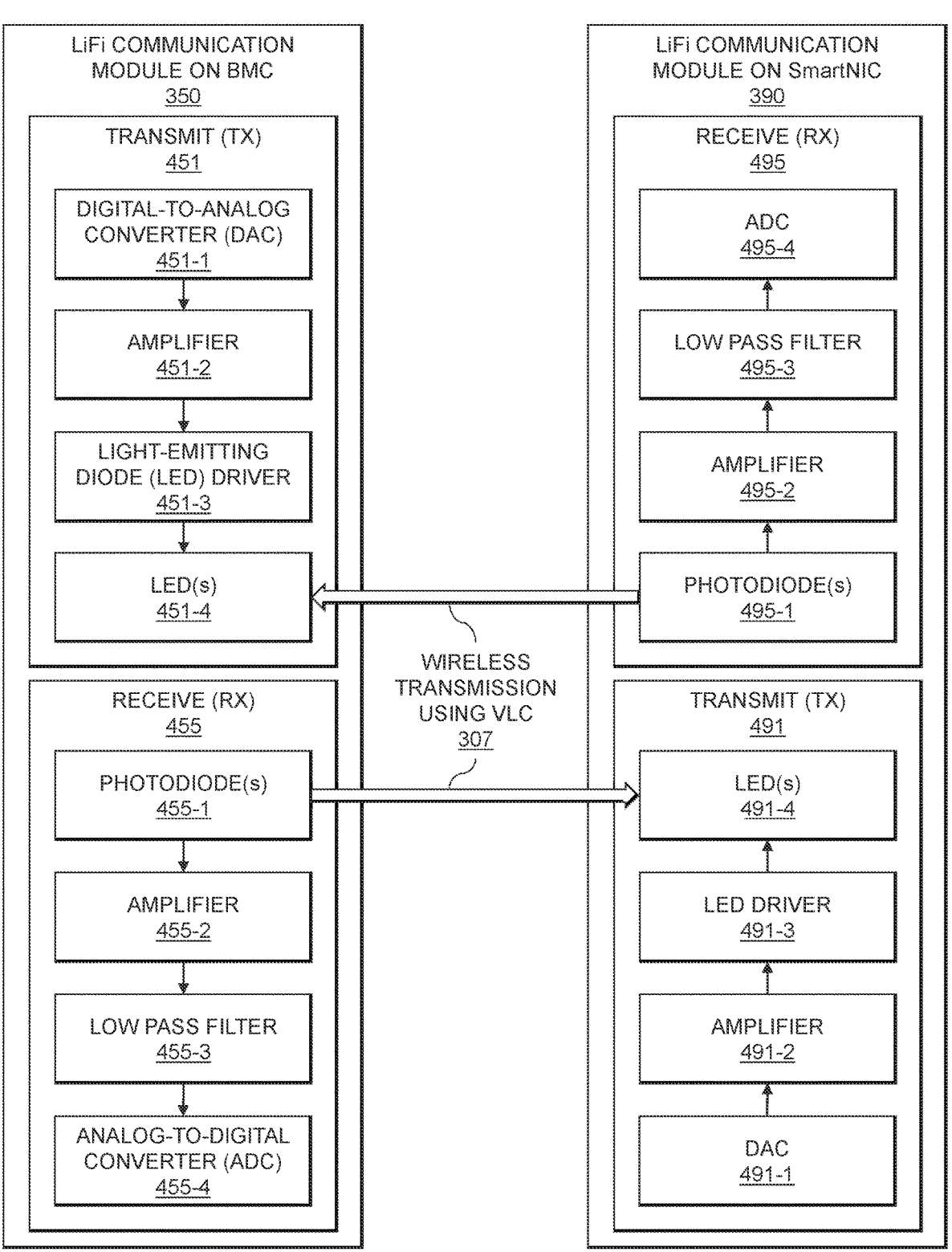
FIG. 4 shows components of light-based communication modules configured for wireless transmission of sideband management data utilizing visible light communication in an illustrative embodiment.

FIG. 3 shows a system 300 including a server chassis 301 including a motherboard 303 with a BMC 305. The motherboard 303 also includes a plurality of PCIe slots 307-1 . . . 307-S (collectively, PCIe slots 307). The PCIe slots 307 may be at a "rear" of the server chassis 301. In the FIG. 3 example, a SmartNIC 309 is installed in PCIe slot 307-1. It should be appreciated, however, that the particular one of the PCIe slots 307 in which the SmartNIC 309 is installed may vary. Further, although not shown in FIG. 3, other components (e.g., additional SmartNICs, DPUs, etc.) may be installed in other ones of the PCIe slots 307. The motherboard 303 may also include various other components, such as a CPU, ports or connections for interfacing with additional components such as storage devices, memory, PSUs, cooling fans, etc. The BMC 305 implements a LiFi communication module 350, and the SmartNIC 309 implements a LiFi communication module 390, details of which are shown in FIG. 4. The LiFi communication modules 350 and 390 are configured for wireless transmission of sideband management data between the BMC 305 and the SmartNIC 309 using VLC 311.

As shown in FIG. 4, the LiFi communication module 350 on the BMC 305 includes a transmit (TX) unit 451 comprising a digital-to-analog converter (DAC) 451-1, an amplifier 451-2, a light-emitting diode (LED) driver 451-3 and one or more LEDs 451-4, and a receive (RX) unit 455 comprising one or more photodiodes 455-1, an amplifier 455-2, a low pass filter 455-3, and an analog-to-digital converter (ADC) 455-4. Similarly, the LiFi communication module 390 on the SmartNIC 309 includes a TX unit 491 comprising a DAC 491-1, an amplifier 491-2, an LED driver 491-3 and one or more LEDs 491-4, and a RX unit 495 comprising one or more photodiodes 495-1, an amplifier 495-2, a low pass filter 495-3 and an ADC 495-4. The TX units 451, 491 are configured to use the DACs 451-1, 491-1 to convert digital data signals to be communicated into analog signals, which are then amplified in amplifiers 451-2, 491-2 and passed to LED drivers 451-3, 491-3 which drive LEDs 451-4, 491-4 to communicate the analog signals wirelessly using VLC 311. The RX units 455, 495 are configured to detect the wirelessly transmitted analog signals using photodiodes 455-1, 495-1, which are then amplified using amplifiers 455-2, 495-2 and passed to low pass filters 455-3, 495-3 with the output thereof being provided to ADCs 455-4, 495-4 which convert the output of the low pass filters 455-3, 495-3 back to digital data signals.

For the operation of virtual mapping of the channels related to each of the PCIe slots 307 of the motherboard 303 of the server chassis 301, some embodiments utilize reconfigurable intelligent surface (RIS) technology in tandem with the PCIe slots 307 that support SmartNICs, DPUs, etc. The BMC 305 controls the RIS, and allows for wavelength modification for each of the SmartNIC or DPU-supported PCIe slots 307. When LiFi sideband management signals are transmitted from the SmartNIC 309, an RIS of the PCIe slot 307-1 in which the SmartNIC 309 is installed alters only the specific wavelength, thereby mapping the SmartNIC 309 to the particular PCIe slot 307-1 based on the wavelength. On the BMC 305 end, the LiFi receiver (e.g., RX unit 495) filters out the specific wavelengths associated with each of the PCIe slots 307. When the signals are transmitted from the BMC 305, an RIS on or associated with the BMC 305 enables transmission on the same associated wavelength to communicate with the SmartNIC 309 in the PCIe slot 307-1. When the SmartNIC 309 receives the light, the RIS filter for the PCIe slot 307-1 allows this wavelength to be received by the LiFi receiver (e.g., the RX unit 455).

Figure 5:
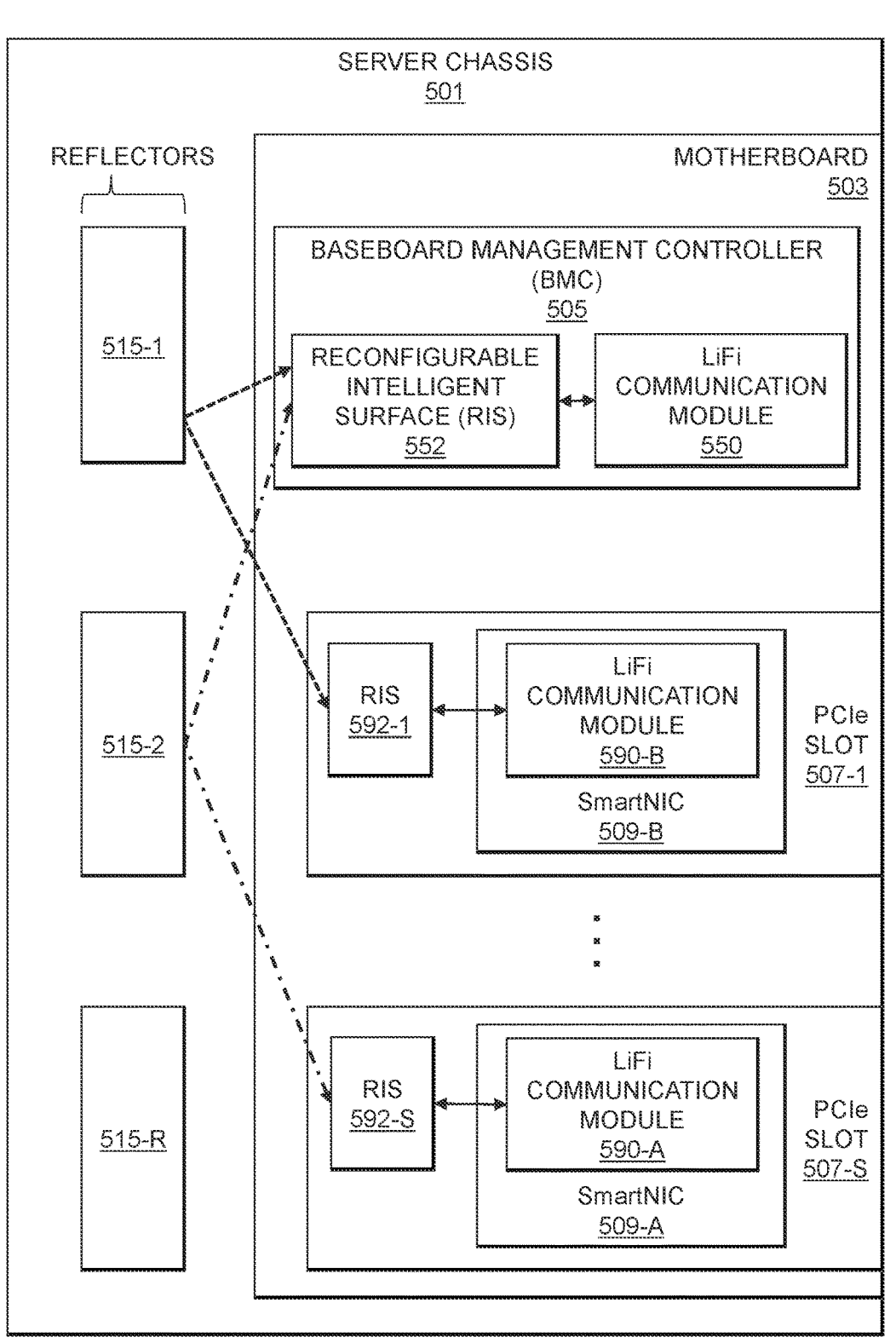
FIG. 5 shows a server chassis with a baseboard management controller and multiple smart network interface cards configured for wireless transmission of sideband management data utilizing different wavelengths of visible light communication in an illustrative embodiment.

FIG. 5 shows a system 500 including a server chassis 501 with a motherboard 503 including a BMC 505 implementing a LiFi communication module 550 and a plurality of PCIe slots 507-1 . . . 507-S (collectively, PCIe slots 507). A first SmartNIC 509-A implementing a LiFi communication module 590-A is installed in PCIe slot 507-S, and a second SmartNIC 509-B implementing a LiFi communication module 590-B is installed in PCIe slot 507-1. The SmartNIC 509-A and SmartNIC 509-B are collectively referred to herein as SmartNICs 509. The LiFi communication modules 550, 590-A and 590-B provide functionality similar to that of the LiFi communication modules 350 and 390. The server chassis 501 further includes a set of reflectors 515-1, 515-2 . . . 515-R (collectively, reflectors 515). Although shown as being external to the motherboard 503 in FIG. 5, in other embodiments one or more of the reflectors 515 may be mounted on or attached to the motherboard 503 (e.g., placed near or adjacent to components which are expected to communicate via wireless transmission using VLC, such as the BMC 505 and the PCIe slots 507 in which the Smart-NICs 509 are installed.

In the FIG. 5 example, the BMC 505 is equipped or associated with RIS 552, the PCIe slot 507-1 in which the SmartNIC 509-B is installed is equipped with RIS 592-1, and the PCIe slot 507-S in which the SmartNIC 509-A is installed is equipped with RIS 592-S. Although shown as being internal to the BMC 505 in FIG. 5, it should be appreciated that the RIS 552 may instead be implemented external to the BMC 505, internal to the LiFi communication module 550, etc. The RIS 552 is controlled by the LiFi communication module 550 to allow for wavelength modification of the visible light communicated as part of VLC of sideband management data transmitted between the BMC 505, the SmartNIC 509-A and the SmartNIC 509-B. The RIS 592-1 and 592-S are configured to allow for transmission of specific wavelengths of light, thus enabling components installed in the PCIe slots 507-1 and 507-S to be mapped to specific wavelengths.

Two virtual channels are mapped to the PCIe slots 507-1 and 507-S using wavelength modification provided by the RIS 592-1 and 592-S. The SmartNIC 509-A in PCIe slot 507-S uses wavelength A ($\lambda_A$) for wireless transmission of sideband management data, while the SmartNIC 509-B in PCIe slot 507-1 uses wavelength B ($\lambda_B$) for wireless transmission of sideband management data. This enables a clear one-to-one mapping between the SmartNICs 509 and the PCIe slots 507 (e.g., by creating virtual VLC channels which use specific wavelengths $\lambda_A$ and $\lambda_B$). The optional reflectors 515 facilitate the VLC transmissions. The RISs 552, 592-1 and 592-S may be used to amplify LiFi signals which pass through them, in addition to providing wavelength modification functionality.

The technical solutions described herein provide a wireless approach for transmitting sideband management data using VLC technology. The technical solutions can therefore provide for communication of sideband management data between hardware components of an IT asset (e.g., between a BMC and one or more SmartNICs, DPUs, etc.). Virtual channel mapping for specific slots (e.g., PCIe slots) is also enabled for detecting the components (e.g., SmartNICs, DPUs, etc.) installed in such slots, which facilitates the communication of sideband management data (e.g., orchestrated by a BMC). Advantageously, the technical solutions provide cost savings by reducing the time and effort spent in installation of MICs and associated cables, as well as troubleshooting of such components (e.g., if they do not work or are not installed correctly by inexperienced users). The technical solutions also provide enhanced security in remote locations (e.g., maintaining edge compute device security), and can be used even in environments where radiofrequency (RF) is not allowed to operate. The technical solutions can provide faster service times, resulting in saving man hours and expenses. Further, the technical solutions provide a secure solution that can be self-contained within a chassis of an IT asset.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for sideband management of IT assets utilizing VLC will now be described in greater detail with reference to FIGS. 6 and 7. Although described in the context of system 100, these platforms may also be used to implement at least portions of other information processing systems in other embodiments.

Figure 6:
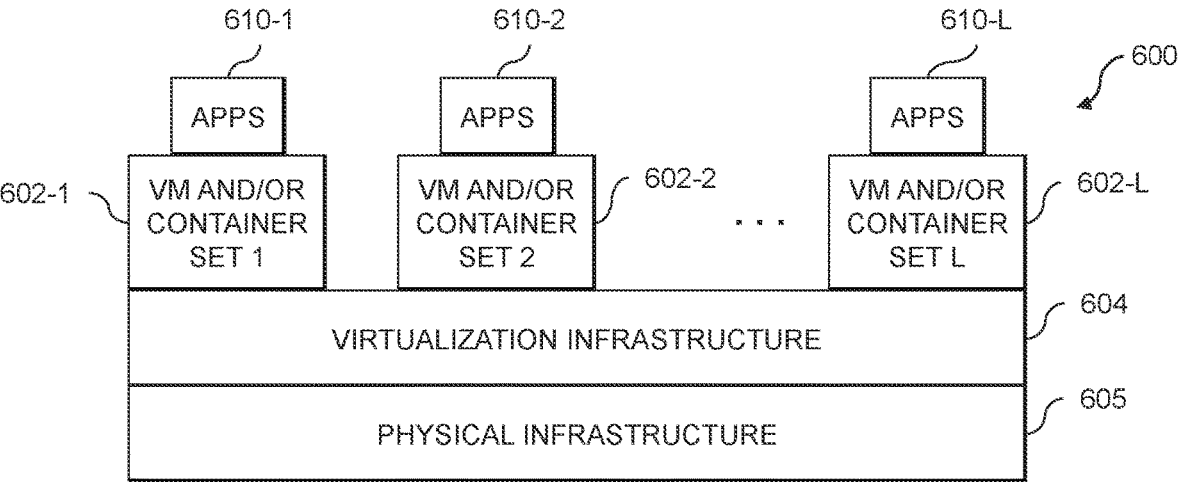
FIGS. 6 and 7 show examples of processing platforms that may be utilized to implement at least a portion of an information processing system in illustrative embodiments.
Figure 7:
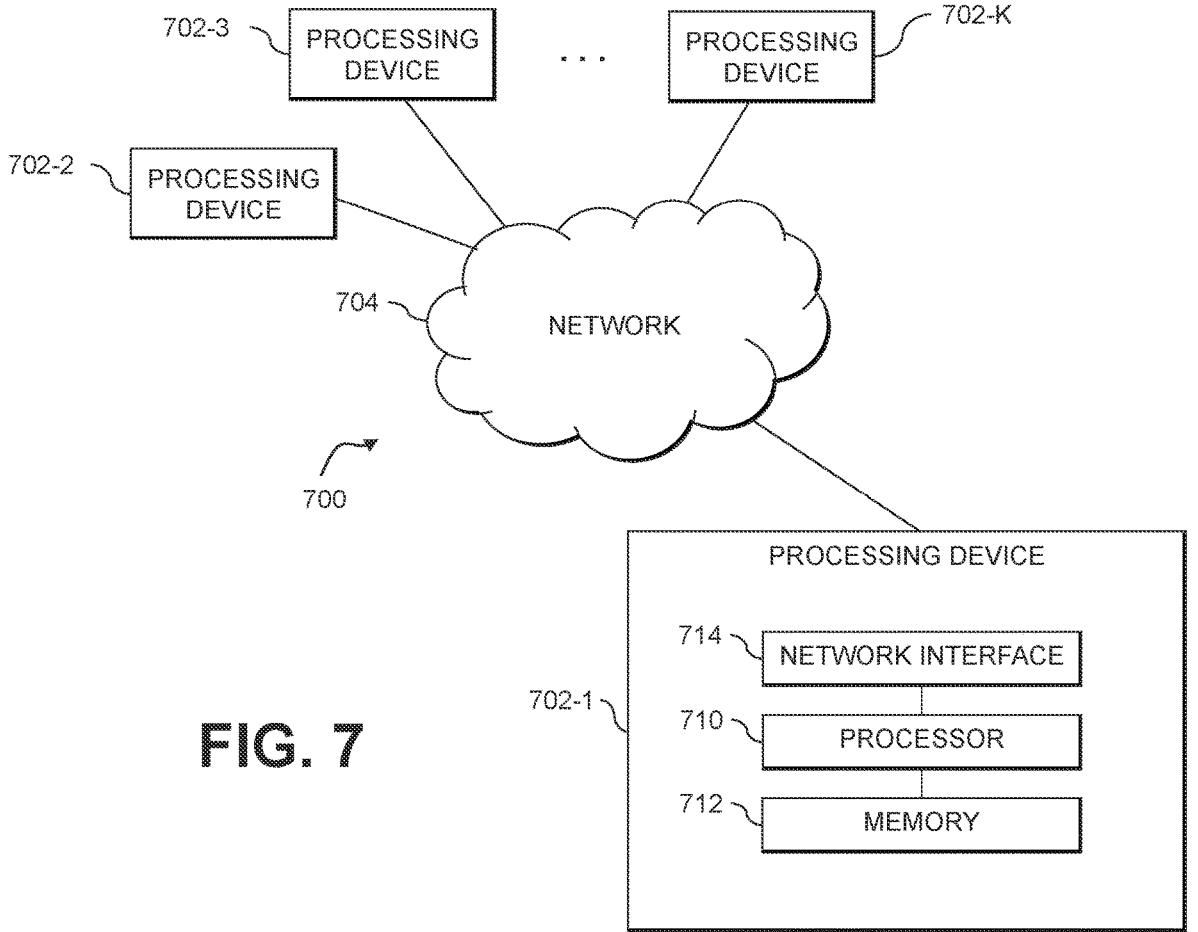

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2 . . . 610-L running on respective ones of the VMs/container sets 602-1, 602-2 . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for sideband management of IT assets utilizing VLC as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to receive, at a first hardware component of an information technology asset, sideband management data for the information technology asset;
to utilize a first light-based communication module of the first hardware component to convert the received sideband management data into one or more visible light communication signals; and
to transmit the received sideband management data by providing the one or more visible light communication signals from the first light-based communication module of the first hardware component of the information technology asset to a second light-based communication module of a second hardware component of the information technology asset;
wherein at least one of the first hardware component and the second hardware component is associated with a reconfigurable intelligent surface configured to control a wavelength of the one or more visible light communication signals provided from the first light-based communication module of the first hardware component to the second light-based communication module of the second hardware component.

2. The apparatus of claim 1 wherein the first hardware component comprises a network interface card and the second hardware component comprises a baseboard management controller.

3. The apparatus of claim 2 wherein the network interface card comprises at least one of a smart network interface card and a data processing unit.

4. The apparatus of claim 2 wherein the network interface card comprises a sideband management network port configured for receiving the sideband management data from a support platform external to the information technology asset.

5. The apparatus of claim 1 wherein the first light-based communication module and the second light-based communication module comprise respective Light Fidelity (LiFi) communication modules.

6. The apparatus of claim 1 wherein the first hardware component is installed in a slot of a motherboard of the information technology asset, wherein the reconfigurable intelligent surface is associated with the slot of the motherboard of the information technology asset in which the first hardware component is installed, and wherein the reconfigurable intelligent surface associated with the slot of the motherboard of the information technology asset in which the first hardware component is installed provides a virtual mapping of the first hardware component to a given wavelength of visible light.

7. The apparatus of claim 1 wherein the first hardware component is installed in a first slot of a motherboard of the information technology asset and a third hardware component is installed in a second slot of the motherboard of the information technology asset, wherein the first slot of the motherboard of the information technology asset is associated with a first reconfigurable intelligent surface and the second slot of the motherboard of the information technology asset is associated with a second reconfigurable intelligent surface, the first reconfigurable intelligent surface providing a first virtual mapping of the first hardware component to a first wavelength of visible light and the second reconfigurable intelligent surface providing a second virtual mapping of the third hardware component to a second wavelength of visible light, the second wavelength of visible light being different than the first wavelength of visible light.

8. The apparatus of claim 7 wherein the first hardware component and the third hardware component comprise respective smart network interface cards.

9. The apparatus of claim 1 wherein the first light-based communication module comprises a transmit unit comprising:

a digital-to-analog converter configured to convert the sideband management data into one or more analog signals;

an amplifier configured to amplify the one or more analog signals; and a light emitting diode (LED) driver configured to drive one or more LEDs of the first light-based communication module to communicate the amplified one or more analog signals as the one or more visible light communication signals.

10. The apparatus of claim 9 wherein the second light-based communication module comprises a receive unit comprising:

one or more photodiodes configured to capture the one or more visible light communication signals communicated from the one or more LEDs of the first light-based communication module;

an amplifier configured to amplify the one or more visible light communication signals captured by the one or more photodiodes;

a low pass filter configured to filter the amplified one or more visible light communication signals captured by the one or more photodiodes; and an analog-to-digital converter configured to convert a filtered output of the low pass filter into one or more digital signals comprising the sideband management data.

11. The apparatus of claim 1 wherein the information technology asset comprises one or more reflectors, and wherein providing the one or more visible light communication signals from the first light-based communication module of the first hardware component of the information technology asset to the second light-based communication module of the second hardware component of the information technology asset comprises reflecting the one or more visible light communication signals using the one or more reflectors.

12. The apparatus of claim 1 wherein the at least one processing device is further configured to receive, at the first light-based communication module of the first hardware component, additional sideband management data communicated as one or more additional visible light communication signals provided from the second light-based communication module of the second hardware component.

13. The apparatus of claim 12 wherein the one or more additional visible light communication signals provided from the second light-based communication module of the second hardware component utilize a given wavelength of visible light mapped to a slot of a motherboard of the information technology asset in which the first hardware component is installed, wherein the reconfigurable intelligent surface is associated with the first hardware component and the slot of the motherboard of the information technology asset in which the first hardware component is installed, and wherein the reconfigurable intelligent surface is configured to provide a virtual mapping of the first hardware component to the given wavelength of visible light.

14. A computer program product comprising a non-transitory processor-readable storage medium having stored therein program code of one or more software programs, wherein the program code when executed by at least one processing device causes the at least one processing device:

to receive, at a first hardware component of an information technology asset, sideband management data for the information technology asset;

to utilize a first light-based communication module of the first hardware component to convert the received sideband management data into one or more visible light communication signals; and to transmit the received sideband management data by providing the one or more visible light communication signals from the first light-based communication module of the first hardware component of the information technology asset to a second light-based communication module of a second hardware component of the information technology asset;

wherein at least one of the first hardware component and the second hardware component is associated with a reconfigurable intelligent surface configured to control a wavelength of the one or more visible light communication signals provided from the first light-based communication module of the first hardware component to the second light-based communication module of the second hardware component.

15. The computer program product of claim 14 wherein the first hardware component comprises a network interface card and the second hardware component comprises a baseboard management controller.

16. A method comprising:

receiving, at a first hardware component of an information technology asset, sideband management data for the information technology asset;

utilizing a first light-based communication module of the first hardware component to convert the received sideband management data into one or more visible light communication signals; and transmitting the received sideband management data by providing the one or more visible light communication signals from the first light-based communication module of the first hardware component of the information technology asset to a second light-based communication module of a second hardware component of the information technology asset;

wherein at least one of the first hardware component and the second hardware component is associated with a reconfigurable intelligent surface configured to control a wavelength of the one or more visible light communication signals provided from the first light-based communication module of the first hardware component to the second light-based communication module of the second hardware component; and wherein the method is performed by at least one processing device comprising a processor coupled to a memory.

17. The method of claim 16 wherein the first hardware component comprises a network interface card and the second hardware component comprises a baseboard management controller.

18. The method of claim 16 wherein the information technology asset comprises one or more reflectors, and wherein providing the one or more visible light communication signals from the first light-based communication module of the first hardware component of the information technology asset to the second light-based communication module of the second hardware component of the information technology asset comprises reflecting the one or more visible light communication signals using the one or more reflectors.

19. The method of claim 16 wherein the at least one processing device is further configured to receive, at the first light-based communication module of the first hardware component, additional sideband management data communicated as one or more additional visible light communication signals provided from the second light-based communication module of the second hardware component.

20. The method of claim 19 wherein the one or more additional visible light communication signals provided from the second light-based communication module of the second hardware component utilize a given wavelength of visible light mapped to a slot of a motherboard of the information technology asset in which the first hardware component is installed, wherein the reconfigurable intelligent surface is associated with the first hardware component and the slot of the motherboard of the information technology asset in which the first hardware component is installed, and wherein the reconfigurable intelligent surface is configured to provide a virtual mapping of the first hardware component to the given wavelength of visible light.

\* \* \* \* \*